United States Patent
Foley et al.

(10) Patent No.: US 7,348,510 B1
(45) Date of Patent: Mar. 25, 2008

(54) SAFETY SWITCH, AND ENCLOSURE AND ELECTRICAL CONNECTOR ASSEMBLY THEREFOR

(75) Inventors: Brendan A. Foley, Cleveland, TN (US); Eddie D. Carson, Cleveland, TN (US); Douglas R. Bender, Cleveland, TN (US); William E. Wilkie, Pinehurst, NC (US); Richard D. Prohaska, Cleveland, TN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/673,753

(22) Filed: Feb. 12, 2007

(51) Int. Cl.
*H02B 13/02* (2006.01)
(52) U.S. Cl. .................. 200/293; 200/51 R; 200/304
(58) Field of Classification Search .. 200/50.28–50.31, 200/51 R–51.04, 304–5; 361/643
See application file for complete search history.

(56) References Cited

U.S. PATENT DOCUMENTS

| | | | | |
|---|---|---|---|---|
| 1,306,343 | A | * | 6/1919 | Krantz ..................... 200/304 |
| 2,457,386 | A | * | 12/1948 | Lindae et al. ............. 200/305 |
| 4,190,222 | A | | 2/1980 | Appleton et al. |
| 6,373,009 | B1 | | 4/2002 | Prohaska et al. |
| 6,998,549 | B1 | | 2/2006 | Bender et al. |
| 2004/0149550 | A1 | * | 8/2004 | Allen ......................... 200/1 R |

OTHER PUBLICATIONS

Cooper Crouse-Hinds, "Posi-Lok Power Distribution System", Crouse-Hinds Cam-lok Connectors, pp. 1-12, undated.
Cooper Crouse-Hinds, "J Power Series Single Pole Cable Connectors", Crouse-Hinds Cam-lok Connectors, pp. 1-11, undated.
Eaton/Cutler-Hammer, "Generator Quick-Connect Double-Throw Safety Switch", pp. 1-5, Feb. 2006.

\* cited by examiner

*Primary Examiner*—Renee Luebke
(74) *Attorney, Agent, or Firm*—Martin J. Moran

(57) ABSTRACT

An electrical connector assembly is provided for an electrical switching apparatus including an enclosure, separable contacts housed by the enclosure, and an operating mechanism structured to open and close the separable contacts. The enclosure has a back panel, sidewalls extending outwardly from the back panel, an exterior and an interior having a plurality of compartments. A first compartment houses the separable contacts and includes a first cover. A second compartment is disposed adjacent the first compartment and includes a second cover. The electrical connector assembly includes a plate member disposed between the first and second compartments, and a plurality of electrical connectors coupled to the plate member and being substantially disposed within the second compartment. The electrical connectors are structured to be electrically connected to the separable contacts, and are substantially inaccessible when the second compartment is covered by the second cover.

6 Claims, 5 Drawing Sheets

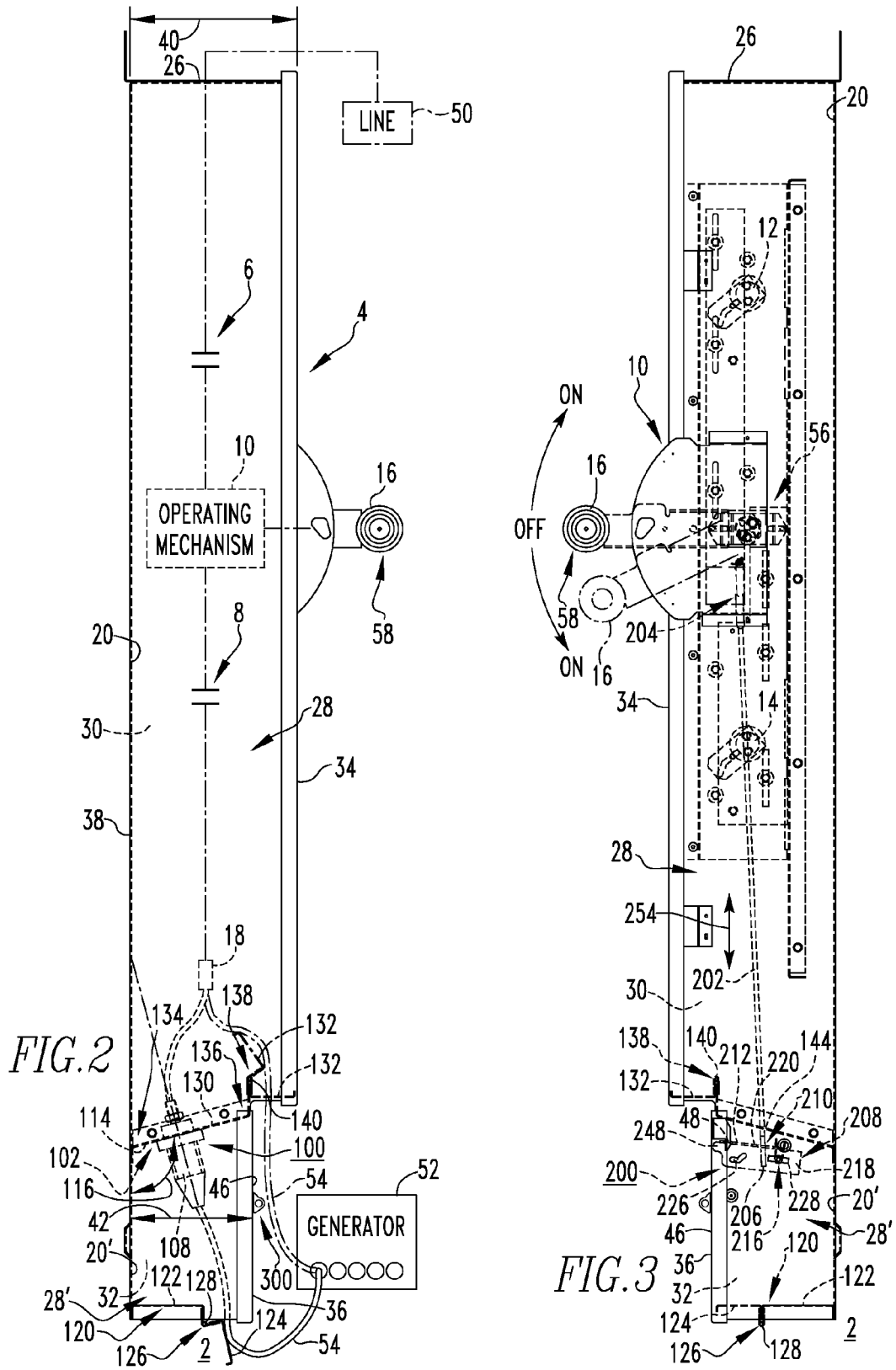

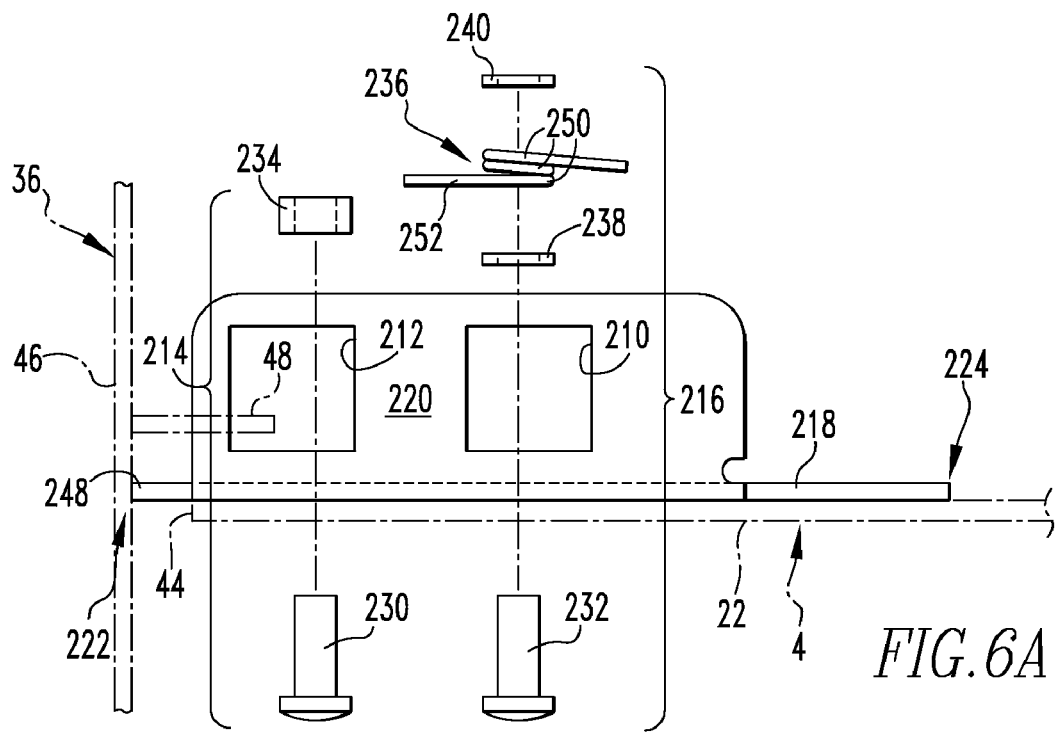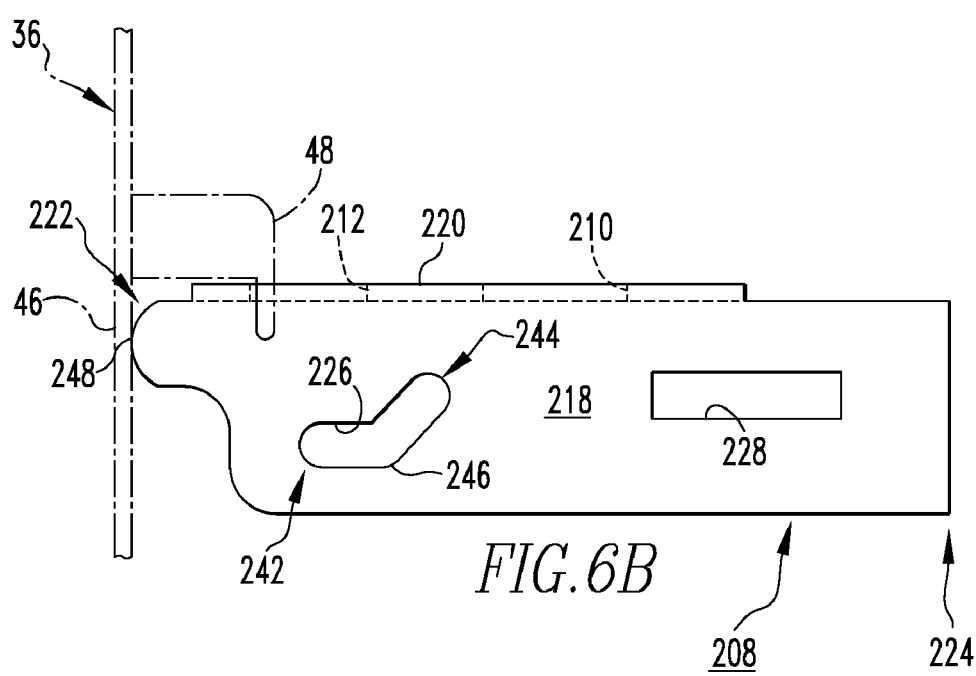

SAFETY SWITCH, AND ENCLOSURE AND ELECTRICAL CONNECTOR ASSEMBLY THEREFOR

CROSS-REFERENCE TO RELATED APPLICATION

This application is related to commonly assigned, concurrently filed:

U.S. patent application Ser. No. 11/673,772, filed Feb. 12, 2007, entitled "Electrical Switching Apparatus and Interlock Assembly Therefor".

BACKGROUND OF THE INVENTION

1. Field of the Invention

The invention relates generally to electrical switching apparatus and, more particularly, to enclosures for safety switches. The invention also relates to electrical connector assemblies for safety switches.

2. Background Information

Safety switches are used in electrical power distribution systems in order to electrically isolate a load or a portion of a power circuit.

Typically, safety switches include an operating mechanism housed within an enclosure, such as a sheet metal cabinet. The operating mechanism includes an operating handle, which typically has either a single-throw configuration, in which the operating handle is operable between two positions (e.g., an ON position and an OFF position), or a double-throw configuration, in which the operating handle has three positions (e.g., a first ON position, a central OFF position, and a second ON position). A more detailed description of the components of safety switches and the operation thereof is provided, for example, in U.S. Pat. No. 6,373,009.

Safety switches are sometimes employed as mechanisms for disconnecting and transferring power that is provided, for example, from a primary power source (e.g., utility service) to a secondary or back-up source (e.g., a generator), for example, in the event that power from the primary power source is interrupted (e.g., a power outage). Such safety switches are sometimes of the aforementioned double-throw variety, with the first ON position corresponding to power being provided to a residence or commercial facility by the primary power source. Following the interruption in primary power, the operating handle can be moved to the second ON position in order that power is supplied to the residence or commercial facility by the generator. More specifically, the safety switch typically includes a number of electrical connectors for receiving conductors (e.g., electrical cables) that extend from the generator. Thus, in a typical power outage scenario, the safety switch operating handle is first turned to the OFF position, and the electrical cables are connected from the generator to the electrical connectors of the safety switch. Connecting the cables when the operating handle is in the OFF position ensures that the safety switch is not energized when the connection is being made, and thereby avoids potential injury. Then, once the electrical cables are safely connected, the operating handle is then turned to the second ON position, in order to source power from the generator.

It is desirable to restore power as quickly as possible in response to a power outage. Accordingly, the electrical connectors of the safety switch are preferably structured to facilitate for the relatively quick and easy connection of the generator cables. To meet this need, prior proposals have employed quick-connect type electrical connectors such as, for example and without limitation, Cam-Lock® and Posi-Lok™ connectors. Cam-Lock® and Posi-Lok™ connectors are available, for example, from Crouse-Hinds Molded Products of LaGrange, N.C. However, known safety switch designs have positioned such quick-connect connectors in an exposed (e.g., outside the safety switch enclosure) or readily accessible position. This presents a serious safety concern. It is, therefore, desirable to provide a safety switch having improved safety features.

It is also desirable to provide a safety switch that is capable of being electrically connected to a wide variety of secondary power sources. Specifically, quick-connect connectors typically require two matching connector components, a first component disposed on the end of each generator cable, and a corresponding second component being disposed at or about the safety switch enclosure and being structured to receive the first component. Accordingly, the safety switch is compatible only with generators or other suitable secondary power sources that have cables with that particular type of matching quick-connect connector. This undesirably limits the available options with respect to providing secondary power.

There is, therefore, room for improvement in safety switches, and in enclosures and electrical connector assemblies therefor.

SUMMARY OF THE INVENTION

These needs and others are met by embodiments of the invention, which provide a connector assembly for safety switches that enables relatively quick and easy electrical connection of a secondary power source (e.g., a generator), yet which is also enclosable in order to resist the ability to inadvertently make such connections when the safety switch is energized.

As one aspect of the invention, an electrical connector assembly is provided for an electrical switching apparatus including an enclosure, separable contacts housed by the enclosure, and an operating mechanism structured to open and close the separable contacts. The enclosure has a back panel, sidewalls extending outwardly from the back panel, an exterior, an interior having a plurality of compartments, and at least one cover. Such cover is structured to overlay a corresponding one of the compartments. The separable contacts are disposed within a first one of the compartments. The electrical connector assembly comprises: a plate member structured to be disposed between the first one of the compartments and a second one of the compartments; and a plurality of electrical connectors coupled to the plate member. The electrical connectors are substantially disposed within the second one of the compartments, and are structured to be electrically connected to the separable contacts. When such cover is overlaying the second one of the compartments, the electrical connectors are substantially inaccessible from the exterior of the enclosure.

The plate member may have a first plane and the back panel of the enclosure may have a second plane, wherein the first plane is structured to be disposed at an angle with respect to the second plane. The plate member may include a plurality of apertures, wherein each of the apertures receives a corresponding one of the electrical connectors, and wherein the electrical connectors are structured to extend outwardly from the plate member and substantially perpendicularly with respect to the first plane thereof. The angle may range from about 95 degrees to about 135 degrees. The electrical connectors may be quick-connectors.

As another aspect of the invention, an enclosure is provided for an electrical switching apparatus including separable contacts and an operating mechanism structured to open and close the separable contacts. The enclosure comprises: a first compartment structured to house the separable contacts, the first compartment including a back panel, sidewalls extending outwardly from the back panel, and a first cover; a second compartment disposed adjacent the first compartment, the second compartment comprising a back panel, sidewalls extending outwardly from the back panel, and a second cover; and an electrical connector assembly comprising: a plate member disposed between the first compartment and the second compartment, and a plurality of electrical connectors coupled to the plate member and being substantially disposed within the second compartment, the electrical connectors being structured to be electrically connected to the separable contacts. When the second compartment is covered by the second cover, the electrical connectors are substantially inaccessible.

As another aspect of the invention, an electrical switching apparatus is provided which is electrically connectable to at least one of a primary power source and a secondary power source. The secondary power source includes a plurality of electrical conductors. The electrical switching apparatus comprises: separable contacts; an operating mechanism including an operating handle, the operating handle being operable among at least a first position corresponding to the separable contacts being open, and a second position corresponding to the separable contacts being closed and the electrical switching apparatus being electrically connectable to the secondary power source; and an enclosure comprising: a first compartment housing the separable contacts, the first compartment including a back panel, sidewalls extending outwardly from the back panel, and a first cover, a second compartment disposed adjacent the first compartment, the second compartment comprising a back panel, sidewalls extending outwardly from the back panel, and a second cover, and an electrical connector assembly comprising: a plate member disposed between the first compartment and the second compartment, and a plurality of electrical connectors coupled to the plate member and being substantially disposed within the second compartment, the electrical connectors being electrically connected to the separable contacts. Each of the electrical connectors is structured to receive a corresponding one of the electrical conductors of the secondary power source and, when the second compartment is covered by the second cover, the electrical connectors are substantially inaccessible.

The second compartment may further comprise an end plate. The end plate may comprise a stationary portion and a movable portion pivotably coupled to the stationary portion, wherein the movable portion is pivotable between a closed position and an open position. When the electrical conductors of the secondary power source are electrically connected to the electrical connectors of the electrical connector assembly and the second cover is overlaying the second compartment of the enclosure, the movable portion of the end plate may be disposed in the open position and the electrical conductors may extend from within the second compartment between the movable portion of the end plate and the second cover. The end plate may further comprise a spring-loaded hinge including a bias element, wherein the spring-loaded hinge pivotably couples the movable portion to the stationary portion, and wherein the bias element of the spring-loaded hinge biases the movable portion toward the closed position.

The plate member may comprise a stationary segment and a movable segment. The stationary segment may have a first end coupled to the back panel of the first compartment and a second end extending outwardly from the back panel of the first compartment. The movable segment may be movably coupled at or about the second end of the stationary segment. The first compartment of the enclosure may have a first depth, and the second compartment may have a second depth, wherein the first depth is greater than the second depth. When the first cover is overlaying the first compartment, the movable segment may extend between the second end of the stationary segment and the first cover. The movable segment may be movable between a closed position and an open position in which the electrical conductors of the secondary power source are receivable between the movable segment and the first cover. The plate member may further comprise a hinge assembly including a number of hinges and at least one removable fastener. The number of hinges may pivotably couple the movable segment to the stationary segment, wherein such removable fastener is structured to fasten the movable segment in the closed position and wherein, when the at least one removable fastener is removed, the movable segment is pivotable to the open position.

The electrical switching apparatus may be a safety switch. The back panel of the first compartment of the enclosure and the back panel of the second compartment of the enclosure may comprise different sections of the same piece of material. The first cover may be a first door pivotably coupled to a corresponding one of the sidewalls of the first compartment, and the second cover may be a second door pivotably coupled to a corresponding one of the sidewalls of the second compartment.

BRIEF DESCRIPTION OF THE DRAWINGS

A full understanding of the invention can be gained from the following description of the preferred embodiments when read in conjunction with the accompanying drawings in which:

FIG. 2 is a side elevation view of the left side of the safety switch, and enclosure and electrical connector assembly therefor of FIG. 1;

FIG. 3 is a side elevation view of the right side of the safety switch and enclosure of FIG. 1, and an interlock assembly therefor, shown in hidden line drawing;

FIGS. 6A and 6B are top plan and side elevation views, respectively, of the bracket member of the interlock assembly of FIG. 5.

DESCRIPTION OF THE PREFERRED EMBODIMENTS

Figure 1:
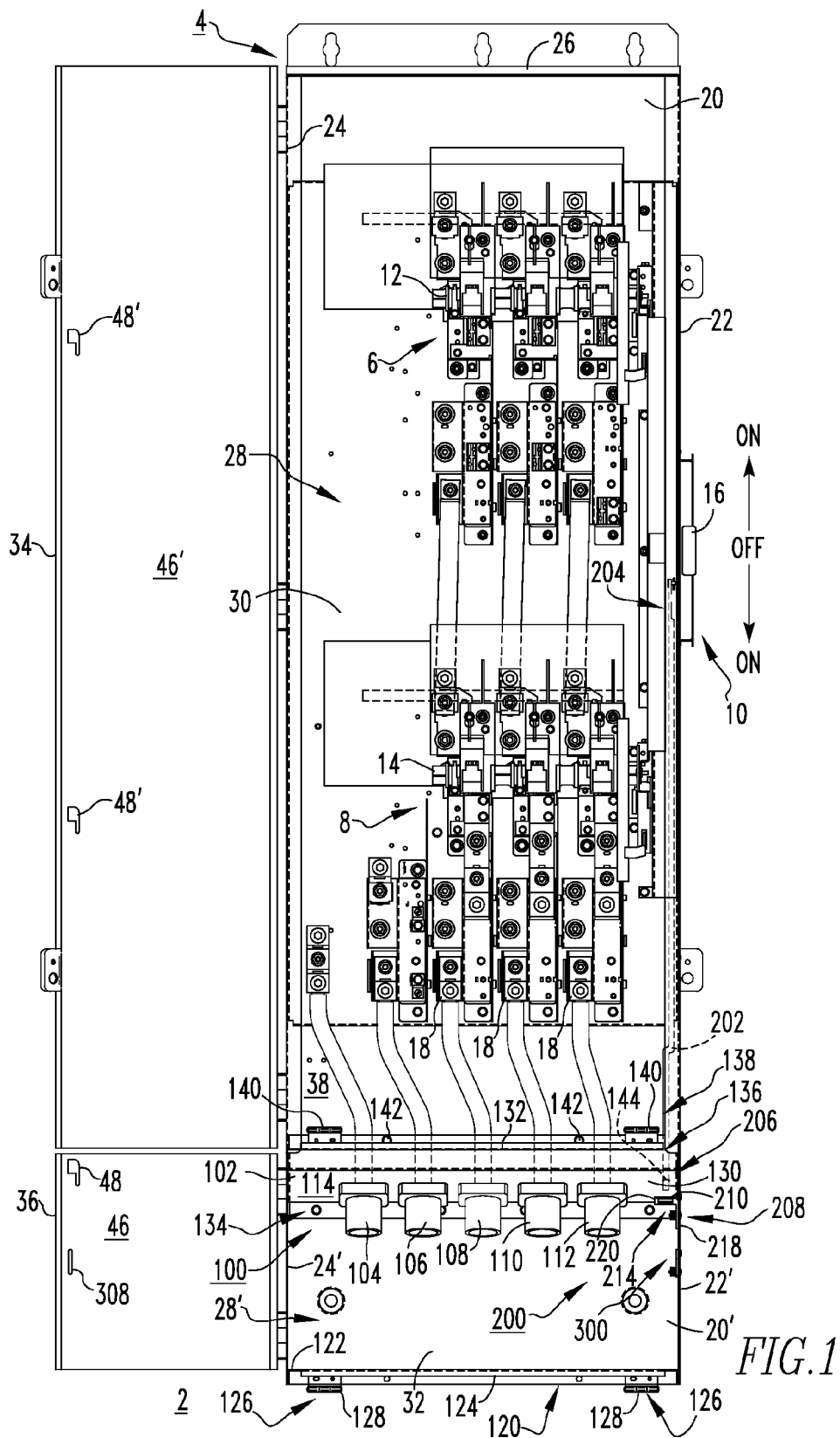
FIG. 1 is a front elevation view of a safety switch, and enclosure and electrical connector assembly therefor, in accordance with embodiments of the invention, with the doors of the enclosure disposed in their open positions to show internal structures.

Directional phrases used herein, such as, for example, left, right, top, bottom, upper, lower, front, back, clockwise, counterclockwise and derivatives thereof, relate to the orientation of the elements shown in the drawings and are not limiting to the claims unless expressly recited therein.

As employed herein, the terms "fastener" and "fastening mechanism" refer to any suitable connecting or tightening material or device expressly including, but not limited to, rivets (e.g., without limitation, pop rivets), screws, bolts and the combinations of bolts and nuts (e.g., without limitation, lock nuts) and bolts, washers (e.g., without limitation, lock washers) and nuts.

As employed herein, the term "linkage" refers to any known or suitable mechanism for interconnecting one component to another component in order to provide mechanical communication therebetween and expressly includes, without limitation, a rigid member, such as a tube, a rod, a shaft, a movable (e.g., without limitation, slidable) plate member, or a link, as well as combinations of a rigid member with a flexible member, such as a cable, a wire, a chain, and an interconnected link or movable plate member.

As employed herein, the term "quick-connect" refers to the ability to relatively rapidly and easily connect one component to another (e.g., without limitation, by only insertion) without requiring a separate tool or numerous (i.e., more than two) steps (e.g., without limitation, insertion and twisting).

As employed herein, the term "quick-connector" refers to any known or suitable connector, receptacle, fastening mechanism or combination thereof which is structured to removably couple one component to another component in a relatively rapid and easy manner, without requiring a separate tool or numerous (i.e., more than two) steps (e.g., without limitation, insertion and twisting) to effectuate the connection, and expressly includes, without limitation, Cam-Lock® connectors and Posi-Lok™ connectors. The quick-connector is also preferably structured to provide relatively rapid and easy disconnecting of the components from one another, without requiring a plurality of separate tools or numerous (i.e., more than two) steps (e.g., without limitation, depressing a release tab and removing; twisting and removing).

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows an electrical switching apparatus 2 employing an electrical connector assembly 100 and an interlock assembly 200. The electrical switching apparatus 2 includes an enclosure 4, separable contacts 6,8 housed by the enclosure 4, and an operating mechanism 10 structured to open and close the separable contacts 6,8. In the example shown and described herein, the electrical switching apparatus is a safety switch 2 having a first set of separable contacts 6 and a second set of separable contacts 8, and the operating mechanism 10 includes first and second pole shafts 12,14 structured to open and close the first and second sets of separable contacts 6,8, respectively. The pole shafts 12,14 are coupled to an operating handle 16. The operating mechanism 10 may be substantially similar to that which is described, for example, in U.S. Pat. No. 6,373,009, which is incorporated herein by reference.

The example operating handle 16 is a double-throw operating handle, which is operable among an OFF position (FIGS. 1-3), a first ON position (not shown) in which the safety switch 2 is electrically connected to a primary power source 50 (shown in phantom line drawing in FIG. 2), and a second ON position (shown in phantom line drawing in FIG. 3) in which the safety switch 2 is electrically connected to a secondary power source such as, for example, the generator 52, shown in FIG. 2. It will, however, be appreciated that the disclosed electrical connector assembly 100 and interlock assembly 200 can be employed with any known or suitable electrical switching apparatus other than the double-throw safety switch 2 shown and described herein. For example and without limitation, the connector assembly 100 and/or the interlock assembly 200 could be suitably adapted for use with an electrical switching apparatus (e.g., without limitation, safety switch) having a single-throw operating handle (not shown) with only one ON position. It will further be appreciated that the disclosed electrical connector assembly 100 and interlock assembly 200 could each be employed with any suitable electrical switching apparatus independently, or in combination.

As shown in FIGS. 1-3, the enclosure 4 has a back panel 20, sidewalls 22,24 (FIG. 1) extending outwardly from the back panel 20, an exterior, an interior 28 having a plurality of compartments 30,32, and at least one cover 34,36 (two covers are shown). The example covers 34,36 are structured to overlay the respective compartments 30,32. The enclosure 4 of the example safety switch 2 has a first compartment 30 and a second compartment 32. The first compartment 30 houses the separable contacts 6,8 (FIGS. 1 and 2) and includes a first cover 34. The second compartment 32 includes a back panel 20', which, in the example shown and described herein, comprises a portion or section of back panel 20, sidewalls 22',24', which, in the example shown and described herein, are portions or sections of sidewalls 22,24, and a second cover 36. In other words, the back panel 20 of the first compartment 30 and the back panel 20' of the second compartment 32 comprise different sections 20,20' of the same piece of material. Likewise, sidewalls 22,24 of first compartment 30 and sidewalls 22',24' of second compartment 32 comprise different sections 22,22' and 24,24', respectively, of the same two pieces of material. The example first and second covers 34,36 are first and second doors pivotably coupled to corresponding sidewalls 24,24' of the first and second compartments 30,32, respectively. It will, however, be appreciated that the enclosure 4 could have any known or suitable alternative number and configuration of compartments and covers therefor. For example and without limitation, rather than being arranged in the over and under configuration, shown in FIGS. 1-3, the first and second compartments 30,32 could alternatively be disposed side-by-side (not shown).

The electrical connector assembly 100 includes a plate member 102 disposed between the first and second compartments 30,32 of the enclosure 4. A plurality of electrical connectors, such as, for example and without limitation, the ground connector 104, neutral connector 106, and three-phase connectors (e.g., without limitation, load connectors; source connectors) 108,110,112, shown in FIG. 1, are coupled to the plate member 102 and electrically connected to the separable contacts 6,8 by way of load terminals 18 (FIGS. 1 and 2). Although three-phase power is shown, the invention is applicable to power sources having any suitable number of phases. The electrical connectors 104,106,108, 110,112 are preferably quick-connectors such as, for example and without limitation, Cam-Lock® connectors (FIGS. 1, 2, 4A and 5) and/or Posi-Lok™ connectors (not shown), in order to simplify the connection process, and they are substantially disposed within the second compartment 32. Accordingly, when the second door 36 is overlaying the second compartment 32, as shown in FIGS. 2 and 3, the electrical connectors 104,106,108,110,112 are substantially inaccessible from the exterior of the enclosure 4. In this manner, the disclosed electrical connector assembly 100 overcomes the disadvantages (e.g., without limitation, inadvertent electrical connection when the safety switch is energized; undesired access to electrical connectors) of known safety switch designs in which electrical connectors are exposed and readily accessible from the exterior of an enclosure.

Figure 4A:
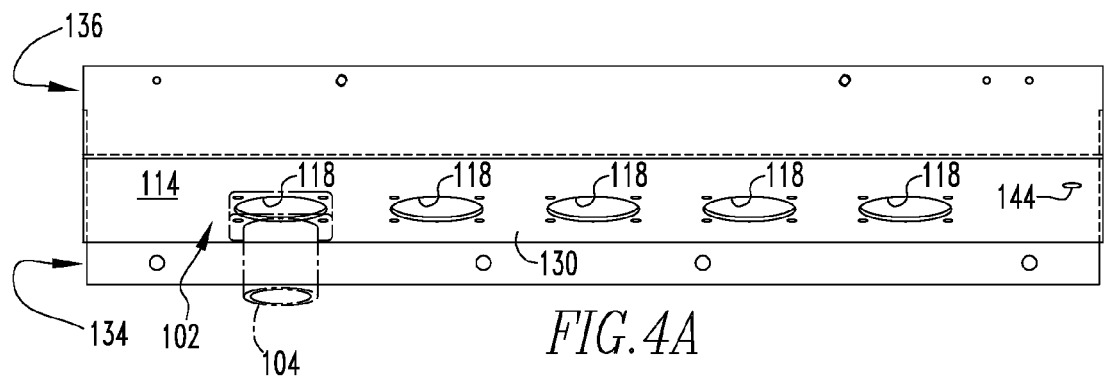
FIGS. 4A and 4B are front elevation and side elevation views, respectively, of the plate member for the electrical connector assembly of FIG. 1.
Figure 4B:
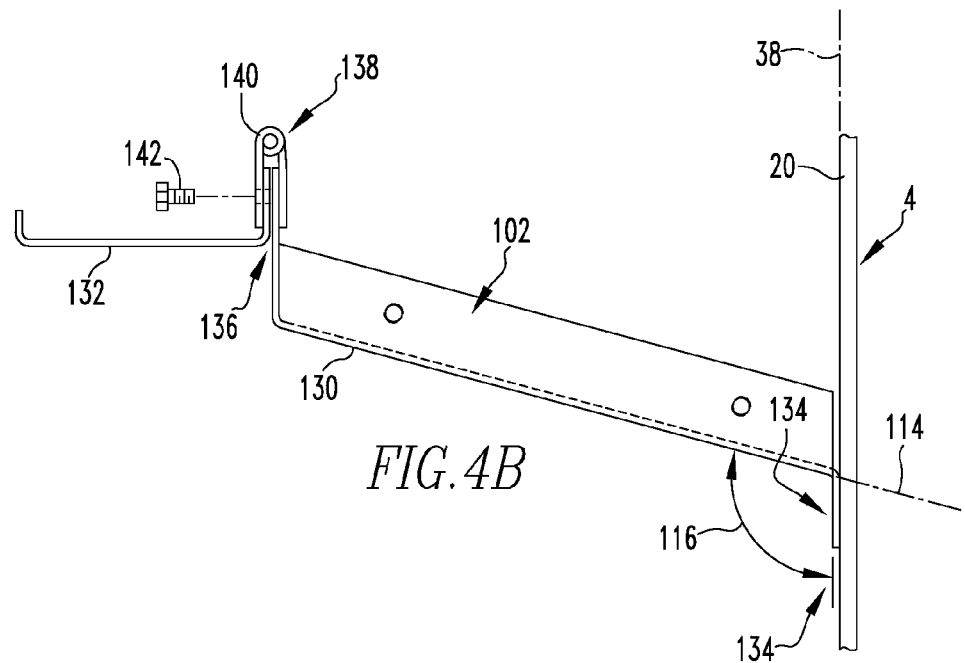

As best shown in the example of FIGS. 2 and 4B, the plate member 102 has a first plane 114 and the back panel 20 of the enclosure 4 has a second plane 38, wherein the first plane 114 is disposed at an angle 116 with respect to the second plane 38. Such angle ranges from about 95 degrees to about 135 degrees. As shown in FIG. 4A, the plate member 102 includes a plurality of apertures 118 that receive the electrical connectors (one electrical connector 104 is shown in phantom line drawing in FIG. 4A). The electrical connectors 104,106,108,110,112 (FIG. 1) are coupled to the plate member 102 using any known or suitable fastening mechanism, and extend outwardly from the plate member 102 and substantially perpendicularly with respect to the first plane 114 thereof (see, for example, load connector 108 shown in hidden line drawing in FIG. 2).

Referring again to FIGS. 1-3, the second compartment 32 of the enclosure 4 of the example safety switch 2 further includes an end plate 120, which is disposed generally opposite and spaced apart from the plate member 102. At least a portion of the end plate 120 is movable between a closed position (FIGS. 1 and 3) and an open position (FIG. 2). More specifically, the end plate 120 comprises a stationary portion 122, and a movable portion 124 pivotally coupled to the stationary portion 122. Accordingly, when the electrical conductors (e.g., without limitation, cable 54 of FIG. 2) that extend from the secondary power source (e.g., without limitation, generator 52 of FIG. 2) are electrically connected to the electrical connectors 104,106,108,110,112 (for simplicity of disclosure, only one cable 54 is shown connected to the one electrical connector 108 in FIG. 2) of the electrical connector assembly 100, and the second door 36 is overlaying the second compartment 32, the movable portion 124 of the end plate 120 is disposed in the open position and the cables 54 (one cable 54 is shown in FIG. 2 for simplicity of disclosure) extend from within the second compartment 32, between the movable portion 124 of the end plate 120 and the second cover 36, to the exterior of the enclosure 4, as shown in FIG. 2. In this manner, the second door 36 of the second compartment 32 can be closed while maintaining the desired electrical connection to the secondary power source 52.

In the example of FIGS. 1-3, the end plate 120 further includes a spring-loaded hinge 126 having a bias element 128. The spring-loaded hinge 126 pivotally couples the movable portion 124 of the end plate 120 to the stationary portion 122, and the bias element 128 biases the movable portion 124 toward the closed position of FIGS. 1 and 3. In this manner, undesirable access to the interior 28' of the enclosure 4 is substantially prevented.

Referring again to FIG. 4B, the plate member 102 of the electrical connector assembly 100 (FIGS. 1-3) includes a stationary segment 130 and a movable segment 132. The stationary segment 130 has a first end 134 coupled to the back panel 20 (partially shown in FIG. 4B) of the first compartment 30 (FIGS. 1-3) of the enclosure 4, and a second end 136 extending outwardly from such back panel 20. The movable segment 132 is movably coupled at or about the second end 136 of the stationary segment 130. In the example of FIG. 4B, the plate member 102 further includes a hinge assembly 138 having a number of hinges 140 (one hinge 140 is shown in the side elevation view of FIG. 4B; see also the two hinges 140 shown in FIG. 1) and at least one removable fastener 142 (one removable fastener 142 is shown in the side elevation view of FIG. 4B; see also the two removable fasteners 142 shown in FIG. 1). The hinges 140 pivotably couple the stationary and movable segments 130, 132, and the removable fastener 142 fastens the movable segment 132 in the closed position shown in FIGS. 1, 2 (hidden line drawing), 3 and 4B. When the removable fastener 142 is removed, the movable portion 132 is pivotable to the open position shown in phantom line drawing in FIG. 2. Accordingly, it will be appreciated that the plate member 102 of the disclosed enclosure 4 provides a mechanism for directly coupling the electrical conductors (e.g., the cable 54) of the secondary power source (e.g., generator 52 of FIG. 2) to the terminals 18 (FIGS. 1 and 2) in the event the electrical connector assembly 100 (FIGS. 1-3) of the safety switch 2 has a different type of electrical connector from that of the conductors 54 (FIG. 2) of the secondary power source 52.

More specifically, as shown in FIG. 2, the first compartment 30 of the example enclosure 4 has a first depth 40, and the second compartment 32 has a second depth 42. The first depth 40 is greater than the second depth 42, in order that the movable segment 132 of plate member 102 extends between the second end 136 of the stationary segment 130 of the plate member 102, and the first door 34. Thus, the movable segment 132 is movable between the closed position, shown in hidden line drawing in FIG. 2, and the open position, shown in phantom line drawing in FIG. 2. In the open position, the electrical conductors 54 (only one is shown) of the secondary power source 52 are receivable between the movable segment 132 and the first door 34, as shown in phantom line drawing.

Figure 5:
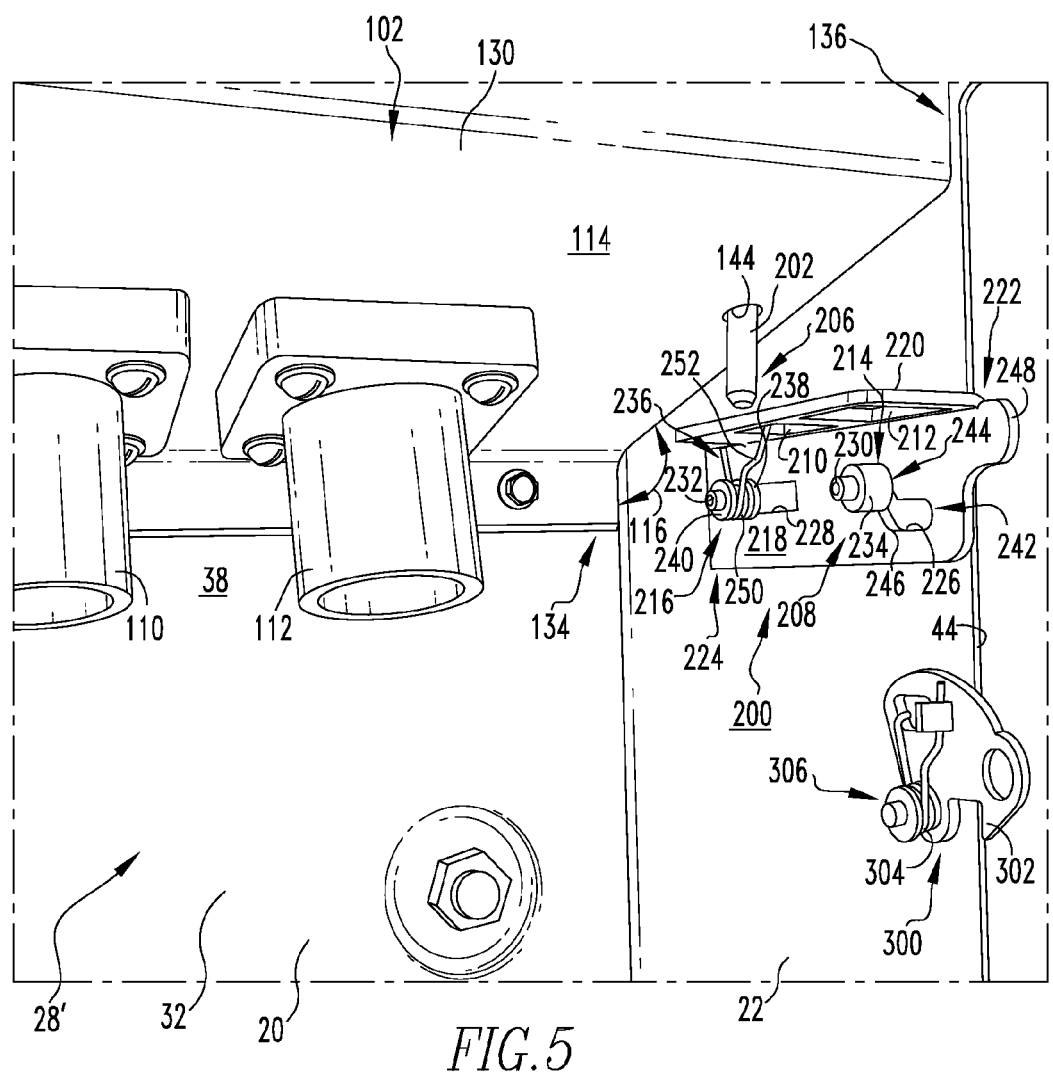
FIG. 5 is an isometric view of a portion of the safety switch, and enclosure and interlock assembly therefor of FIG. 3.

Referring again to FIG. 1, and also to FIGS. 3 and 5, the aforementioned interlock assembly 200 will now be discussed. Specifically, the operating handle 16 of the safety switch 2 has a first end 56 (FIGS. 2 and 3) pivotably coupled to the sidewall 22 of the enclosure 4, and a second end 58 disposed opposite and distal from the first end 56. The interlock assembly 200 includes at least one linkage 202 having a first end 204 (FIGS. 1 and 3) and a second end 206. The first end 204 (FIGS. 1 and 3) is structured to be coupled to the operating handle 16 (FIGS. 1 and 3) of the safety switch 2 (FIGS. 1 and 3) at or about the first end 56 of the operating handle 16, in order that movement of the operating handle 16 (FIGS. 1 and 3) results in a corresponding movement of the second end 206 of the linkage 202. The example linkage is a single-piece rod 202, although it will be appreciated that any known or suitable alternative number and configuration of linkages, as defined herein, could be employed. A bracket member 208, which includes at least one aperture 210,212 (the example bracket member 208 has first and second apertures 210, 212 as best shown in FIG. 6A) is movably coupled to a corresponding one of the sidewalls (e.g., sidewall 22 of FIG. 1) of the enclosure 4 by at least one fastening mechanism 214,216 (best shown in FIG. 6A). The bracket member 208 is movable between a first position (FIGS. 1 and 5) corresponding to the bracket 208 being structured to prevent the second end 206 of the linkage 202 from entering the first aperture 210, thereby resisting undesired movement of the operating handle 16, and a second position (FIG. 3) corresponding to the second end 206 of the linkage 202 being receivable by the first aperture 210 in order that the operating handle 16 is movable. In other words, when the second door 36 (FIGS. 1-3)

is disposed in the open position (FIG. 1), the bracket member 208 is disposed in the first position, as shown in FIGS. 1 and 5, and when the second door 36 (FIGS. 1-3) is disposed in the closed position (FIGS. 2-3), the bracket member 208 is disposed in the second position, as shown in FIG. 3.

As shown in FIGS. 5 and 6A, the bracket member 208 includes a first planar portion 218, which is structured to be substantially parallel with respect to a corresponding sidewall 22 of the enclosure 4, and a second planar portion 220 extending substantially perpendicularly outwardly from the first planar portion 218. The second planar portion 220 of the example bracket member 208 includes the first and second apertures 210,212, and the first planar portion 218 has a first end 222 extending toward the exterior of the enclosure, a second end 224 disposed opposite and distal from the first end 222, and at least one elongated opening 226,228 (FIGS. 5 and 6B) therebetween.

As shown in FIG. 6B, the first planar portion 218 of the example bracket member 208 includes a first elongated slot 226 and a second elongated slot 228 and, as shown in FIG. 6A, the example fastening mechanism comprises a first fastener 214 and a second fastener 216. Each of the first and second fasteners 214,216 includes a shaft 230,232, respectively, which is disposed in a corresponding one of the first elongated slot 226 and the second elongated slot 228, as shown in FIG. 5. Accordingly, when the second door 36 (FIGS. 1-3) of the enclosure 4 is moved from the open position toward the closed position, the bracket member 208 moves with respect to first fastener 214, second fastener 216, and the corresponding sidewall 22 of the enclosure 4, in order to align the first aperture 210 of the bracket member 208 with respect to the second end 206 of the linkage 202, as shown in FIG. 3.

Continuing to refer to FIG. 6A, it will be appreciated that the first fastener 214, which in the example shown and described herein is a rivet, further includes a retention element 234 (e.g., without limitation, a bushing; a washer). As shown in FIG. 5, the shaft 230 of the first fastener 214 extends outwardly from the sidewall 22 of the enclosure 4, through the first elongated slot 226, and beyond the first planar portion 218 of the bracket member 208. The retention element 234 is then coupled to the shaft 230 of the first fastener 214 proximate the first planar portion 218 in order to retain the bracket member 208 on the shaft 230. Similarly, the shaft 232 of the second fastener 216 extends outwardly from sidewall 22, through the second elongated slot 228, and beyond the first planar portion 218 of the bracket member 208. However, the second fastener 216 further includes a bias member, such as the spring 236 shown in FIG. 5. The spring 236 is disposed on the shaft 232 of second fastener 216 between a pair of retention elements 238,240. More specifically, the spring 236 includes a number of coils 250 and a biasing arm 252. The coils 250 of the spring 236 are received by the shaft 232 of the second fastener 216, and the biasing arm 252 engages the first aperture 210 of the bracket member 218, thereby biasing the bracket member 208 toward the first position, as shown in FIG. 5. It will, however, be appreciated that any known or suitable alternative fastening mechanism, as defined herein, could be employed in any suitable alternative configuration, without departing from the scope of the invention.

As best shown in FIG. 6B, the first elongated slot 226 includes a first end 242, a second end 244, and a turn 246 between the first and second ends 242,244. In this manner, the bracket member 208 is capable of both pivoting and sliding with respect to the fastening mechanisms 214,216 (FIGS. 5 and 6A) and sidewall 22 (FIGS. 5 and 6A) of the enclosure 4 (FIGS. 5 and 6A). More specifically, the sidewall 22 of enclosure 4 has an edge 44 (FIG. 5), and the first end 222 of the first planar portion 218 of bracket member 208 includes a protrusion 248 structured to be engaged and moved by the second door 36 (FIGS. 1-3) of the enclosure 4. When the bracket member 208 is disposed in the first position, shown in FIG. 5, the protrusion 248 extends beyond the edge 44. When the second door 36 (FIGS. 1-3) of the enclosure 4 is disposed in the closed position, and the second end 206 of the linkage 202 is disposed in the first aperture 210, as shown in FIG. 3, the second aperture 212 is structured to receive a portion of the second door 36 (best shown in phantom line drawing in FIGS. 6A and 6B), in order to fasten it closed. In particular, the example second door 36 includes a panel member 46 and a protrusion 48 extending generally perpendicularly outwardly therefrom. The protrusion 48, which in the example shown and described herein comprises a latch, engages the bracket member 208 at the second aperture 212 of the bracket member 208 of the disclosed interlock assembly 200 when the second door 36 is closed, as shown in FIG. 3. In this manner, the second door 36 is fastened in the closed position when the operating handle 16 of the safety switch 2 is operable to the second ON position (shown in phantom line drawing in FIG. 3).

Accordingly, it will be appreciated that the disclosed interlock assembly 200 resists operation of the operating handle 16 from the intermediate OFF position to the second ON position (shown in phantom line drawing in FIG. 3) when the second door 36 is disposed in the open position (FIG. 1). In doing so, the linkage 202 of the interlock assembly 200 moves in the direction generally indicated by arrow 254 in FIG. 3, as it extends from proximate the first end 56 of the operating handle 16 in the first compartment 30 of enclosure 4, through an opening 144 in plate member 102, and into the second compartment 32 to the bracket member 208 disposed therein.

It will be appreciated that the first door 34 of the enclosure 4 could include a separate panel member 46' having a suitable number of protrusions 48' (e.g., without limitation, latches), as shown in FIG. 1. It will also be appreciated that the enclosure 4 could optionally additionally include one or more door latch assemblies, such as the spring-loaded door latch assembly 300 shown in FIG. 5, to provide a mechanism for locking the second door 36 of the enclosure 4 in the closed position. The example spring-loaded door latch assembly 300 includes a latch 302 pivotably coupled to sidewall 22 of the enclosure 4 by fastener 306, and a spring 304. The latch 302 is biased by spring 304 toward the position shown in FIG. 5, and is structured to extend through the opening 308 (FIG. 1) of second door 36 when the door is closed, as shown in FIG. 2. A padlock (not shown) or other suitable locking mechanism (not shown) can then be inserted through the hole in the latch 302, for example, to lock the second door 36 shut and further prevent undesired access to the interior of the second compartment 32 of the enclosure 4.

It will, therefore, be appreciated that the disclosed electrical connector assembly 100 and interlock assembly 200 provide mechanisms which can be employed independently or in combination to resist undesired access to the interior 28' of the safety switch enclosure 4 and components housed therein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An enclosure for an electrical switching apparatus including separable contacts and an operating mechanism structured to open and close said separable contacts, said enclosure comprising:
a first compartment structured to house said separable contacts, said first compartment including a back panel, sidewalls extending outwardly from said back panel, and a first cover;
a second compartment disposed adjacent said first compartment, said second compartment comprising a back panel, sidewalls extending outwardly from said back panel, and a second cover;
an electrical connector assembly comprising:
a plate member disposed between said first compartment and said second compartment,
a plurality of electrical connectors coupled to said plate member and being substantially disposed within said second compartment, said electrical connectors being structured to be electrically connected to said separable contacts,
wherein, when said second compartment is covered by said second cover, said electrical connectors are substantially inaccessible; and
wherein said plate member comprises a stationary segment and a movable segment; wherein said stationary segment has a first end coupled to said back panel of said first compartment, and a second end extending outwardly from said back panel of said first compartment; and wherein said movable segment is movably coupled at or about the second end of said stationary segment.

2. The enclosure of claim 1 wherein said enclosure has an interior and an exterior; wherein said first compartment has a first depth; wherein said second compartment has a second depth; wherein the first depth is greater than the second depth; wherein, when said first cover is covering said first compartment, said movable segment extends between the second end of said stationary segment and said first cover; and wherein said movable segment is movable between a closed position and an open position in which access to the interior of said enclosure from the exterior of said enclosure is provided between said movable segment and said first cover.

3. The enclosure of claim 1 wherein said plate member further comprises a hinge assembly including a number of hinges and at least one removable fastener; wherein said number of hinges pivotably couple said movable segment to said stationary segment; wherein said at least one removable fastener is structured to fasten said movable segment in said closed position; and wherein, when said at least one removable fastener is removed, said movable segment is pivotable to said open position.

4. An electrical switching apparatus electrically connectable to at least one of a primary power source and a secondary power source, said secondary power source including a plurality of electrical conductors, said electrical switching apparatus comprising:
separable contacts;
an operating mechanism including an operating handle, said operating handle being operable among at least a first position corresponding to said separable contacts being open, and a second position corresponding to said separable contacts being closed and said electrical switching apparatus being electrically connectable to said secondary power source;
an enclosure comprising:
a first compartment housing said separable contacts, said first compartment including a back panel, sidewalls extending outwardly from said back panel, and a first cover,
a second compartment disposed adjacent said first compartment, said second compartment comprising a back panel, sidewalls extending outwardly from said back panel, and a second cover, an electrical connector assembly comprising:
a plate member disposed between said first compartment and said second compartment,
a plurality of electrical connectors coupled to said plate member and being substantially disposed within said second compartment, said electrical connectors being electrically connected to said separable contacts,
wherein each of said electrical connectors is structured to receive a corresponding one of said electrical conductors of said secondary power source,
wherein, when said second compartment is covered by said second cover, said electrical connectors are substantially inaccessible; and
wherein said plate member comprises a stationary segment and a movable segment; wherein said stationary segment has a first end coupled to said back panel of said first compartment and a second end extending outwardly from said back panel of said first compartment; and wherein said movable segment is movably coupled at or about the second end of said stationary segment.

5. The electrical switching apparatus of claim 4 wherein said first compartment of said enclosure has a first depth; wherein said second compartment has a second depth; wherein the first depth is greater than the second depth; wherein, when said first cover is overlaying said first compartment, said movable segment extends between the second end of said stationary segment and said first cover; and wherein said movable segment is movable between a closed position and an open position in which said electrical conductors of said secondary power source are receivable between said movable segment and said first cover.

6. The electrical switching apparatus of claim 4 wherein said plate member further comprises a hinge assembly including a number of hinges and at least one removable fastener; wherein said number of hinges pivotably couple said movable segment to said stationary segment; wherein said at least one removable fastener is structured to fasten said movable segment in said closed position; and wherein, when said at least one removable fastener is removed, said movable portion is pivotable to said open position.

* * * * *